United States Patent
Vaidhyanathan et al.

(10) Patent No.: US 12,427,453 B2
(45) Date of Patent: Sep. 30, 2025

(54) MICROPLASTIC FILTER FOR WASHING MACHINES OR OTHER APPLIANCES

(71) Applicant: Samsung Electronics Co., Ltd., Suwon-si (KR)

(72) Inventors: Raveendran Vaidhyanathan, Rockaway, NJ (US); Viktor Kopyrin, Grosse Pointe Shores, MI (US)

(73) Assignee: Samsung Electronics Co., Ltd., Suwon-si (KR)

( * ) Notice: Subject to any disclaimer, the term of this patent is extended or adjusted under 35 U.S.C. 154(b) by 426 days.

(21) Appl. No.: 18/058,792

(22) Filed: Nov. 25, 2022

(65) Prior Publication Data

US 2024/0173655 A1    May 30, 2024

(51) Int. Cl.
| | |
|---|---|
| *B01D 33/48* | (2006.01) |
| *B01D 29/64* | (2006.01) |
| *B01D 33/27* | (2006.01) |
| *B01D 33/46* | (2006.01) |
| *D06F 39/10* | (2006.01) |

(52) U.S. Cl.
CPC ............. *B01D 33/48* (2013.01); *B01D 33/27* (2013.01); *B01D 33/466* (2013.01); *D06F 39/10* (2013.01); *B01D 29/6469* (2013.01); *B01D 29/6476* (2013.01); *B01D 2201/08* (2013.01); *B01D 2201/36* (2013.01); *B01D 2201/602* (2013.01); *B01D 2221/02* (2013.01); *C02F 2307/12* (2013.01)

(58) Field of Classification Search
None
See application file for complete search history.

(56) References Cited

U.S. PATENT DOCUMENTS

| | | | | |
|---|---|---|---|---|
| 431,448 | A | * | 7/1890 | Dixon .................... B01D 29/33 |
| | | | | 210/512.1 |
| 2,103,966 | A | * | 12/1937 | Behan ..................... D06F 13/00 |
| | | | | 68/53 |
| 2,196,804 | A | * | 4/1940 | Ball ....................... A47L 15/247 |
| | | | | 68/18 F |
| 2,413,954 | A | * | 1/1947 | Conterman ............ D06F 39/10 |
| | | | | 210/454 |

(Continued)

FOREIGN PATENT DOCUMENTS

| | | |
|---|---|---|
| CN | 211142557 U | 7/2020 |
| CN | 109423858 B | 2/2021 |
| CN | 114717815 A | 7/2022 |

*Primary Examiner* — Robert J Popovics

(57) ABSTRACT

A microplastic filter includes a housing including an inlet configured to receive water. The microplastic filter also includes a fine filter disposed to rotate within the housing and configured to filter residues from the water. The microplastic filter further includes an inside wiper disposed within the fine filter. The inside wiper includes a center post disposed along a rotational axis of the fine filter and a helical curved wall spirally extending between the center post and the fine filter, where the helical curved wall is configured to guide a portion of the water to backflow through the fine filter and force away at least some filtered residues from pores of the fine filter to prevent fouling or clogging of the fine filter. In addition, the microplastic filter includes an outside wiper spirally disposed around the fine filter and configured to dislodge other filtered residues from the fine filter as the fine filter rotates.

20 Claims, 4 Drawing Sheets

(56) References Cited

U.S. PATENT DOCUMENTS

| | | | | |
|---|---|---|---|---|
| 2,439,535 A * | 4/1948 | Wilson | A47L 15/4206 | 210/171 |
| 2,509,753 A * | 5/1950 | Woodson | D06F 13/02 | 68/23.5 |
| 2,512,394 A * | 6/1950 | Sullivan | D06F 39/10 | D23/209 |
| 2,527,531 A * | 10/1950 | Cates, Jr. | B01D 46/00 | 261/6 |
| 2,536,087 A * | 1/1951 | Powers | D06F 39/10 | 68/18 F |
| 2,555,725 A * | 6/1951 | Archbold | D06F 39/10 | 68/12.02 |
| 2,575,542 A * | 11/1951 | Wubbe | D06F 39/10 | 292/250 |
| 2,586,508 A * | 2/1952 | Brotman | D06F 39/10 | 68/18 F |
| 2,621,505 A * | 12/1952 | Smith | B01D 35/10 | 210/138 |
| 2,678,732 A * | 5/1954 | Banks | B01D 29/6476 | 210/414 |
| 2,927,451 A * | 3/1960 | Bochan | D06F 39/10 | 68/18 F |
| 2,936,604 A * | 5/1960 | Glendening | D06F 39/10 | 210/167.01 |
| 2,939,305 A * | 6/1960 | Neidhart | D06F 23/04 | 210/162 |
| 2,942,444 A * | 6/1960 | Abresch | D06F 39/10 | 68/17 A |
| 2,944,415 A * | 7/1960 | Smith | D06F 39/10 | 134/182 |
| 2,962,886 A * | 12/1960 | Johnson | D06F 21/02 | 68/18 F |
| 2,971,362 A * | 2/1961 | Olding | D06F 39/10 | 68/53 |
| 2,984,359 A * | 5/1961 | O'Brien | D06F 39/10 | 210/94 |
| 3,027,742 A * | 4/1962 | Nowicki | D06F 39/10 | 210/403 |
| 3,040,552 A * | 6/1962 | Platt | D06F 39/10 | 68/18 F |
| 3,240,345 A * | 3/1966 | Butler | D06F 39/10 | 210/167.01 |
| 3,264,661 A * | 8/1966 | Mason | D06F 39/10 | 210/791 |
| 3,275,143 A * | 9/1966 | Bochan | B01D 29/66 | 210/167.01 |
| 3,312,088 A * | 4/1967 | Toma | D06F 39/10 | 68/18 F |
| 3,348,688 A * | 10/1967 | Patterson | D06F 39/10 | 210/473 |
| 3,365,063 A * | 1/1968 | Cobb | D06F 39/10 | 210/473 |
| 3,394,809 A * | 7/1968 | Hunter | D21D 5/06 | 210/415 |
| 3,407,633 A * | 10/1968 | Giambertoni | D06F 39/10 | 68/18 F |
| 3,487,944 A * | 1/1970 | Belle | D06F 39/10 | 210/463 |
| 3,495,713 A * | 2/1970 | Hsu | D06F 39/10 | 210/477 |
| 3,596,480 A * | 8/1971 | Douglas | D06F 39/10 | 68/18 FA |
| 3,622,003 A * | 11/1971 | Czech | D06F 39/10 | 210/488 |
| 3,638,799 A * | 2/1972 | Serowiecki | B01D 29/27 | 210/462 |
| 3,650,129 A * | 3/1972 | Scroop | D06F 37/308 | 137/818 |
| 3,653,807 A * | 4/1972 | Platt | D06F 37/145 | 210/791 |
| 3,681,947 A * | 8/1972 | Cowan | B01D 29/46 | 210/167.01 |
| 3,696,033 A * | 10/1972 | Fano et al. | B01D 29/44 | 210/482 |
| 3,727,435 A * | 4/1973 | Menk | D06F 39/10 | 68/18 F |
| 3,738,126 A * | 6/1973 | Smith | D06F 39/10 | 68/18 F |
| 3,739,915 A * | 6/1973 | Kehoe | B01D 29/118 | 210/399 |
| 3,757,543 A * | 9/1973 | Braga | D06F 39/02 | 68/17 R |
| 3,759,392 A * | 9/1973 | Syrjanen | B01D 29/682 | 210/415 |
| 3,762,563 A * | 10/1973 | Petersen | B01D 29/6476 | 210/415 |
| 3,762,565 A * | 10/1973 | Okuniewski | F16L 37/0925 | 210/460 |
| 3,769,818 A * | 11/1973 | Smith | D06F 37/145 | 210/167.01 |
| 3,774,418 A * | 11/1973 | Ohmann | D06F 39/10 | 210/167.01 |
| 3,804,258 A * | 4/1974 | Okuniewski | B01D 29/23 | 285/259 |
| 3,836,001 A * | 9/1974 | Heldreth | F04D 29/708 | 210/167.01 |
| 3,865,243 A * | 2/1975 | Salminen | D21D 5/06 | 209/240 |
| 3,891,548 A * | 6/1975 | Marcussen | B01D 35/28 | 210/791 |
| 3,896,641 A * | 7/1975 | Worst | D06F 39/10 | 68/17 R |
| 3,910,076 A * | 10/1975 | Ruble | D06F 13/00 | 68/184 |
| 3,949,578 A * | 4/1976 | Heldreth | D06F 39/085 | 210/167.01 |
| 3,959,138 A * | 5/1976 | Nichols | B01D 29/232 | 210/94 |
| 3,960,733 A * | 6/1976 | Van Dieren | B01D 29/23 | 210/485 |
| 3,977,219 A * | 8/1976 | Bochan | D06F 39/10 | 210/411 |
| 3,984,330 A * | 10/1976 | Nichols | B01D 29/232 | 210/460 |
| 3,997,441 A * | 12/1976 | Pamplin, Jr. | B01D 37/02 | 210/791 |
| 4,003,225 A * | 1/1977 | Worst | D06F 39/10 | 68/18 FA |
| 4,081,975 A * | 4/1978 | Wortham | D06F 39/10 | 68/18 FA |
| 4,123,361 A * | 10/1978 | Marschman | D06F 39/10 | 210/232 |
| 4,217,220 A * | 8/1980 | Egli | B01D 29/118 | 210/791 |
| 4,217,667 A * | 8/1980 | Whitehouse | E03C 1/26 | 4/290 |
| 4,220,540 A * | 9/1980 | Hagihara | B01D 29/33 | 210/415 |
| 4,309,284 A * | 1/1982 | Morimoto | D21D 5/026 | 209/273 |
| 4,357,813 A * | 11/1982 | Sherer | D06F 13/02 | 210/167.01 |
| 4,417,457 A * | 11/1983 | Brenner | D06F 39/024 | 68/17 A |
| 4,455,844 A * | 6/1984 | McMillan | D06F 39/10 | 210/167.01 |
| 4,485,645 A * | 12/1984 | Mulder | D06F 39/10 | 68/18 F |
| 4,523,992 A * | 6/1985 | Sackett | B01D 35/14 | 210/232 |
| 4,566,970 A * | 1/1986 | Piai | D06F 39/10 | 68/18 F |
| 4,622,142 A * | 11/1986 | Teranishi | B01D 35/147 | 210/453 |
| 4,691,538 A * | 9/1987 | Shikamori | D06F 13/02 | 68/12.18 |
| 4,806,241 A * | 2/1989 | Holien | B01D 29/336 | 210/463 |

(56) References Cited

U.S. PATENT DOCUMENTS

| | | | | |
|---|---|---|---|---|
| 4,833,900 A * | 5/1989 | Babuin | D06F 39/10 | 68/18 F |
| 4,848,105 A * | 7/1989 | O'Connell | D06F 39/10 | 210/167.01 |
| 4,906,367 A * | 3/1990 | Villagomez | B01D 29/27 | 68/18 F |
| 4,919,797 A * | 4/1990 | Chupka | D21D 5/026 | 209/273 |
| 4,970,880 A * | 11/1990 | Luger | D06F 39/10 | 68/208 |
| 5,018,372 A * | 5/1991 | Altnau, Sr. | D06F 39/10 | 68/53 |
| 5,078,862 A * | 1/1992 | Justice | B01D 35/02 | 210/500.1 |
| 5,178,752 A * | 1/1993 | McKinnon | B01D 29/27 | 210/474 |
| 5,285,665 A * | 2/1994 | Hetrick, Jr. | D06F 39/20 | 422/123 |
| 5,353,612 A * | 10/1994 | Noguchi | D06F 33/32 | 68/12.02 |
| 5,437,789 A * | 8/1995 | Sabo | D06F 39/10 | 210/473 |
| 5,493,745 A * | 2/1996 | Hauch | D06F 39/083 | 68/18 F |
| 5,501,792 A * | 3/1996 | Carroll, Jr. | D06F 39/20 | 210/167.01 |
| 5,509,283 A * | 4/1996 | Lee | D06F 39/083 | 68/53 |
| 5,573,677 A * | 11/1996 | Dembrosky | E03B 1/04 | 210/764 |
| 5,660,063 A * | 8/1997 | Lee | D06F 39/10 | 210/167.01 |
| 5,661,989 A * | 9/1997 | Jeon | D06F 39/083 | 68/23.5 |
| 5,827,423 A * | 10/1998 | Lee | D06F 39/10 | 210/167.01 |
| 5,829,275 A * | 11/1998 | Babuin | D06F 39/082 | 68/18 F |
| 5,849,182 A * | 12/1998 | Shin | B01D 29/52 | 210/167.01 |
| 5,858,220 A * | 1/1999 | Shin | B01D 29/05 | 210/167.01 |
| 5,863,423 A * | 1/1999 | Shin | D06F 39/10 | 210/167.01 |
| D407,870 S * | 4/1999 | Pappas | D32/25 | |
| 5,931,027 A * | 8/1999 | Shin | D06F 39/10 | 210/167.01 |
| 5,931,028 A * | 8/1999 | Shin | D06F 39/10 | 210/167.01 |
| 5,989,418 A * | 11/1999 | Shin | D06F 39/10 | 210/167.01 |
| 6,029,479 A * | 2/2000 | Pattee | B01D 17/0202 | 68/18 F |
| 6,076,378 A * | 6/2000 | Shin | D06F 39/10 | 68/18 F |
| 6,145,350 A * | 11/2000 | Hwang | D06F 17/06 | 68/53 |
| D435,946 S * | 1/2001 | Buenik | D32/25 | |
| 6,167,733 B1 * | 1/2001 | Lee | D06F 39/10 | 68/18 F |
| 6,195,825 B1 * | 3/2001 | Jones | D06F 39/20 | 210/791 |
| 6,210,573 B1 * | 4/2001 | Marshall | B01D 29/27 | 210/462 |
| 6,253,584 B1 * | 7/2001 | Shin | D06F 39/10 | 68/18 F |
| 6,253,585 B1 * | 7/2001 | Wright | D06F 39/10 | 68/18 F |
| 6,299,779 B1 * | 10/2001 | Pattee | D06F 39/00 | 210/167.3 |
| 6,393,643 B1 * | 5/2002 | Wientjens | D06F 39/20 | 68/18 F |
| 6,474,111 B1 * | 11/2002 | Pattee | C02F 9/00 | 210/195.1 |
| 6,766,670 B2 * | 7/2004 | Estes | D06F 43/00 | 68/18 F |
| 6,820,447 B2 * | 11/2004 | Thies | D06F 39/10 | 68/18 F |
| 6,852,221 B2 * | 2/2005 | Smolley | D06F 39/10 | 210/474 |
| 6,938,627 B2 * | 9/2005 | Jung | A47L 15/4206 | 68/18 F |
| 7,000,437 B2 * | 2/2006 | Raney | A47L 15/42 | 68/19 |
| 7,073,520 B2 * | 7/2006 | Zanello | D06F 39/10 | 134/110 |
| 7,210,182 B2 * | 5/2007 | Fyvie | D06F 43/085 | 68/18 F |
| 7,243,512 B2 * | 7/2007 | Kim | D06F 39/085 | 210/512.1 |
| 7,267,289 B2 * | 9/2007 | Lyons | D06F 39/10 | 239/524 |
| 7,275,400 B2 * | 10/2007 | Severns | D06F 43/02 | 68/18 F |
| D556,402 S * | 11/2007 | Carlson | D32/25 | |
| 7,351,269 B2 * | 4/2008 | Yau | A47L 9/20 | 55/296 |
| 7,406,843 B2 * | 8/2008 | Thies | D06F 39/10 | 210/519 |
| 7,418,842 B2 * | 9/2008 | Cimetta | D06F 39/10 | 68/18 F |
| 7,491,337 B2 * | 2/2009 | Karaman | C02F 1/28 | 210/725 |
| 7,836,733 B2 * | 11/2010 | Bae | D06F 39/10 | 68/18 F |
| 7,882,715 B2 * | 2/2011 | Yoo | D06F 39/10 | 210/167.01 |
| 7,926,310 B2 * | 4/2011 | Yoo | D06F 39/10 | 68/18 F |
| 7,966,848 B2 * | 6/2011 | Jang | D06F 39/083 | 68/18 F |
| 8,020,413 B2 * | 9/2011 | Yoo | D06F 39/10 | 68/18 F |
| 8,033,144 B2 * | 10/2011 | Yoo | D06F 39/10 | 68/18 F |
| 8,037,721 B2 * | 10/2011 | Yoo | D06F 39/10 | 210/167.01 |
| D686,376 S * | 7/2013 | Barnhill | D32/30 | |
| 8,499,590 B2 * | 8/2013 | Yoo | D06F 39/10 | 68/3 R |
| 8,511,116 B2 * | 8/2013 | Nakamura | D06F 39/083 | 68/18 F |
| 8,601,836 B2 * | 12/2013 | Kim | D06F 39/10 | 68/18 F |
| 8,881,555 B2 * | 11/2014 | Kim | D06F 39/083 | 68/18 F |
| 9,220,392 B2 * | 12/2015 | Morrison | B01D 29/01 | |
| 9,327,219 B2 * | 5/2016 | Brunswick | B01D 29/114 | |
| 9,551,104 B2 * | 1/2017 | Lee | D06F 39/083 | |
| 10,286,339 B2 * | 5/2019 | Crandall | B01D 35/02 | |
| 10,646,801 B2 * | 5/2020 | Tameroglu | B01D 29/6415 | |
| 10,655,265 B2 * | 5/2020 | Xu | D06F 39/10 | |
| 10,815,600 B2 * | 10/2020 | Jung | D06B 1/02 | |
| 10,858,776 B2 * | 12/2020 | Lee | D06F 29/00 | |
| 11,045,843 B2 * | 6/2021 | Lyne | D06F 58/22 | |
| 11,311,825 B2 * | 4/2022 | Hess | E04H 4/1209 | |
| 11,352,734 B2 * | 6/2022 | Zhao | D06F 39/085 | |
| 11,358,077 B2 * | 6/2022 | Muenzer | B08B 1/165 | |
| 11,484,818 B2 * | 11/2022 | De Los Reyes, III | B01D 29/114 | |
| 11,598,043 B2 * | 3/2023 | Cangiano | D06F 23/04 | |
| 11,648,592 B2 * | 5/2023 | Borghi | B01D 29/356 | 134/111 |
| 11,668,037 B2 * | 6/2023 | Dudhe | D06F 39/10 | 8/158 |
| 11,872,507 B2 * | 1/2024 | Jellinggaard | B01D 29/682 | |
| 11,885,063 B2 * | 1/2024 | Roetker | D06F 23/025 | |
| 11,898,298 B2 * | 2/2024 | Lee | D06F 39/10 | |
| 11,976,401 B2 * | 5/2024 | Lee | D06F 33/47 | |

(56) References Cited

U.S. PATENT DOCUMENTS

| | | | |
|---|---|---|---|
| 12,018,426 B1* | 6/2024 | Trouba | D06F 39/10 |
| 12,139,843 B2* | 11/2024 | Bauer | D06F 39/10 |
| 12,180,641 B2* | 12/2024 | Pessot | D06F 39/085 |
| 12,208,348 B2* | 1/2025 | Vestman | B01D 29/35 |
| 12,274,962 B2* | 4/2025 | Eisen | B01D 29/606 |
| 2002/0116960 A1* | 8/2002 | Nakada | D06F 37/14 68/19.2 |
| 2002/0162177 A1* | 11/2002 | Raney | D06F 39/00 68/18 F |
| 2003/0135934 A1* | 7/2003 | Banerjee | C11D 3/43 68/18 F |
| 2003/0209041 A1* | 11/2003 | Thies | D06F 39/10 68/16 |
| 2004/0094471 A1* | 5/2004 | Cole | B01D 29/27 210/460 |
| 2004/0129032 A1* | 7/2004 | Severns | C11D 3/3765 68/23.5 |
| 2004/0129034 A1* | 7/2004 | Zanello | D06F 39/10 68/3 R |
| 2004/0159130 A1* | 8/2004 | Lee | D06F 39/10 68/18 F |
| 2005/0000920 A1* | 1/2005 | Smolley | D06F 39/10 210/791 |
| 2005/0246843 A1* | 11/2005 | Song | D06F 39/10 68/3 R |
| 2005/0252533 A1* | 11/2005 | Baeck | D06F 39/007 68/18 F |
| 2006/0060669 A1* | 3/2006 | Lyons | D06F 39/10 239/288 |
| 2006/0075790 A1* | 4/2006 | Jeon | D06F 39/02 68/210 |
| 2006/0174664 A1* | 8/2006 | Cimetta | D06F 39/10 68/18 F |
| 2006/0185403 A1* | 8/2006 | Ikemizu | D06F 37/225 68/12.02 |
| 2006/0254626 A1* | 11/2006 | Botts | A47L 15/0055 68/17 R |
| 2006/0260064 A1* | 11/2006 | Luckman | D06F 43/08 68/3 R |
| 2007/0240457 A1* | 10/2007 | Jang | D06F 39/083 68/18 F |
| 2008/0155759 A1* | 7/2008 | Mantle | D06F 43/08 8/142 |
| 2008/0196452 A1* | 8/2008 | Bae | D06F 39/10 68/237 |
| 2008/0216518 A1* | 9/2008 | Yoo | D06F 39/10 68/12.13 |
| 2008/0216519 A1* | 9/2008 | Yoo | D06F 39/10 68/12.13 |
| 2008/0216520 A1* | 9/2008 | Yoo | D06F 39/10 210/470 |
| 2008/0216522 A1* | 9/2008 | Yoo | D06F 39/10 210/232 |
| 2008/0216523 A1* | 9/2008 | Yoo | D06F 39/10 68/212 |
| 2008/0217243 A1* | 9/2008 | Yoo | D06F 39/10 210/636 |
| 2009/0071912 A1* | 3/2009 | Mishina | B01D 33/275 210/791 |
| 2009/0235960 A1* | 9/2009 | Yoo | D06F 37/145 134/110 |
| 2011/0047714 A1* | 3/2011 | Kim | D06F 39/10 68/12.13 |
| 2011/0220586 A1* | 9/2011 | Levitt | B01D 29/6415 210/791 |
| 2012/0024773 A1* | 2/2012 | Morrison | D06F 39/10 134/109 |
| 2012/0186306 A1* | 7/2012 | Kim | D06F 39/10 68/18 F |
| 2013/0036776 A1* | 2/2013 | Seo | D06F 37/145 68/18 F |
| 2013/0276484 A1* | 10/2013 | Mantle | D06F 39/10 68/18 F |
| 2013/0312201 A1* | 11/2013 | Frucco | D06F 39/10 68/18 F |
| 2014/0102154 A1* | 4/2014 | Lee | D06F 39/083 68/18 F |
| 2014/0124432 A1* | 5/2014 | Yoon | B01D 29/114 210/355 |
| 2014/0238089 A1* | 8/2014 | Jeong | F04D 29/628 415/121.2 |
| 2014/0298590 A1* | 10/2014 | Fulmer | D06F 39/10 68/18 F |
| 2015/0013397 A1* | 1/2015 | Kim | D06F 39/083 68/3 R |
| 2015/0165354 A1* | 6/2015 | Brunswick | B01D 29/15 210/415 |
| 2015/0225888 A1* | 8/2015 | Kim | D06F 39/10 68/18 F |
| 2015/0246377 A1* | 9/2015 | He | B08B 3/14 68/18 F |
| 2015/0345070 A1* | 12/2015 | Butterworth, III | D06F 39/10 68/18 F |
| 2016/0130741 A1* | 5/2016 | Kim | D06F 39/10 68/18 F |
| 2016/0183763 A1* | 6/2016 | Li | A47L 15/4219 68/18 F |
| 2017/0136391 A1* | 5/2017 | Crandall | A46B 3/00 |
| 2017/0233938 A1* | 8/2017 | Hwang | D06F 39/10 68/18 F |
| 2018/0179693 A1* | 6/2018 | Lee | D06F 29/00 |
| 2018/0313023 A1* | 11/2018 | Piekarski | B01D 33/11 |
| 2019/0126326 A1* | 5/2019 | Lyne | D06F 39/10 |
| 2019/0201818 A1* | 7/2019 | Johann | B01D 29/682 |
| 2020/0391141 A1* | 12/2020 | Spies | A47L 13/50 |
| 2022/0001310 A1* | 1/2022 | Jellinggaard | B01D 29/682 |
| 2022/0008845 A1* | 1/2022 | Girondi | D06F 39/083 |
| 2022/0154385 A1* | 5/2022 | Antell | D06F 39/085 |
| 2022/0228310 A1 | 7/2022 | Cho et al. | |
| 2022/0259793 A1* | 8/2022 | Cangiano | D06F 39/10 |
| 2022/0298695 A1* | 9/2022 | Lee | B01D 29/6469 |
| 2022/0339562 A1* | 10/2022 | Vestman | C02F 1/001 |
| 2023/0030772 A1* | 2/2023 | Root | D06F 39/10 |
| 2023/0078618 A1* | 3/2023 | Becchio | B01D 29/606 210/107 |
| 2023/0123507 A1* | 4/2023 | Roetker | D06F 39/10 68/12.19 |
| 2023/0124777 A1* | 4/2023 | Roetker | D06F 23/025 68/12.02 |
| 2023/0130797 A1* | 4/2023 | Blömer | D06F 21/06 68/24 |
| 2023/0149835 A1* | 5/2023 | Gauthier | B01D 24/12 210/263 |
| 2023/0167599 A1* | 6/2023 | Rios Acebal | D06F 58/22 |
| 2023/0183912 A1* | 6/2023 | Cangiano | D06F 39/10 68/18 F |
| 2023/0203739 A1* | 6/2023 | Kojima | D06F 39/083 68/12.13 |
| 2023/0212807 A1* | 7/2023 | Seo | D06F 39/10 68/18 F |
| 2023/0286846 A1* | 9/2023 | Root | B01D 35/1435 |
| 2023/0330568 A1* | 10/2023 | Root | D06F 39/10 |
| 2023/0381693 A1* | 11/2023 | Wallace | B01D 29/01 |
| 2023/0398474 A1* | 12/2023 | Mattley | B01D 33/56 |
| 2023/0416971 A1* | 12/2023 | Seo | D06F 39/081 |
| 2024/0052545 A1* | 2/2024 | Cho | B01D 35/143 |
| 2024/0052546 A1* | 2/2024 | Lee | B01D 35/02 |
| 2024/0052547 A1* | 2/2024 | Lee | D06F 39/10 |
| 2024/0052548 A1* | 2/2024 | Seo | B01D 35/02 |
| 2024/0110325 A1* | 4/2024 | Mattley | B01D 33/801 |
| 2024/0133111 A1* | 4/2024 | Stephan | B01D 35/153 |
| 2024/0150954 A1* | 5/2024 | Basso | B01D 61/147 |
| 2024/0173655 A1* | 5/2024 | Vaidhyanathan | D06F 39/10 |
| 2024/0209560 A1* | 6/2024 | Palanisamy | B01D 33/466 |
| 2024/0216839 A1* | 7/2024 | D'Orton-Gibson | B01D 29/682 |
| 2024/0218580 A1* | 7/2024 | Lee | D06F 39/085 |

(56) References Cited

U.S. PATENT DOCUMENTS

| | | | |
|---|---|---|---|
| 2024/0229338 A9* | 7/2024 | Stephan | B01D 35/153 |
| 2024/0238702 A1* | 7/2024 | Lawrance-Owen | B01D 29/945 |
| 2024/0238704 A1* | 7/2024 | D'Orton-Gibson | C02F 1/001 |
| 2024/0270604 A1* | 8/2024 | Spiel | C02F 1/001 |
| 2024/0270605 A1* | 8/2024 | Spiel | B01D 29/15 |
| 2024/0417911 A1* | 12/2024 | Hong | B01D 35/02 |
| 2025/0034787 A1* | 1/2025 | Lv | B01D 33/48 |
| 2025/0041774 A1* | 2/2025 | Ronn | B01D 37/048 |
| 2025/0051985 A1* | 2/2025 | Trave | D06F 33/34 |
| 2025/0051986 A1* | 2/2025 | Trave | D06F 33/38 |
| 2025/0066984 A1* | 2/2025 | Park | B01D 29/114 |
| 2025/0073623 A1* | 3/2025 | Berndsen | B01D 29/76 |
| 2025/0075402 A1* | 3/2025 | Park | D06F 39/02 |
| 2025/0075403 A1* | 3/2025 | Becchio | D06F 39/10 |
| 2025/0075405 A1* | 3/2025 | Becchio | D06F 39/085 |
| 2025/0084581 A1* | 3/2025 | Becchio | B01D 29/6476 |
| 2025/0090982 A1* | 3/2025 | Flisek | B01D 29/62 |
| 2025/0114802 A1* | 4/2025 | Pennington | B04C 3/00 |
| 2025/0121382 A1* | 4/2025 | Pennington | B04C 3/06 |

* cited by examiner

MICROPLASTIC FILTER FOR WASHING MACHINES OR OTHER APPLIANCES

TECHNICAL FIELD

This disclosure relates generally to filtering devices and processes. More specifically, this disclosure relates to a microplastic filter for washing machines or other appliances.

BACKGROUND

Microplastic pollution is an unaddressed problem within the appliance industry. For example, in washing machines, microplastics from clothing can be dislodged during cleaning and can be released into the sewage system when the washing effluent is drained. This may allow microplastic contamination to enter wastewater treatment systems or other water-related systems or the environment.

SUMMARY

This disclosure provides a microplastic filter for washing machines or other appliances.

In a first embodiment, a microplastic filter includes a housing including an inlet configured to receive water. The microplastic filter also includes a fine filter disposed to rotate within the housing and configured to filter residues from the water. The microplastic filter further includes an inside wiper disposed within the fine filter. The inside wiper includes a center post disposed along a rotational axis of the fine filter and a helical curved wall spirally extending between the center post and the fine filter, where the helical curved wall is configured to guide a portion of the water to backflow through the fine filter and force away at least some filtered residues from pores of the fine filter to prevent fouling or clogging of the fine filter. In addition, the microplastic filter includes an outside wiper spirally disposed around the fine filter and configured to dislodge other filtered residues from the fine filter as the fine filter rotates.

In a second embodiment, an appliance includes a drain configured to output water and a microplastic filter. The microplastic filter includes a housing comprising an inlet configured to receive the water. The microplastic filter also includes a fine filter disposed to rotate within the housing and configured to filter residues from the water. The microplastic filter further includes an inside wiper disposed within the fine filter. The inside wiper includes a center post disposed along a rotational axis of the fine filter and a helical curved wall spirally extending between the center post and the fine filter, where the helical curved wall is configured to guide a portion of the water to backflow through the fine filter and force away at least some filtered residues from pores of the fine filter to prevent fouling or clogging of the fine filter. In addition, the microplastic filter includes an outside wiper spirally disposed around the fine filter and configured to dislodge other filtered residues from the fine filter as the fine filter rotates.

In a third embodiment, a method includes receiving water through an inlet of a housing. The method also includes filtering residues from the water using a fine filter rotating within the housing. The method further includes guiding a portion of the water to backflow through the fine filter using an inside wiper disposed within the fine filter. The inside wiper includes a center post disposed along a rotational axis of the fine filter and a helical curved wall spirally extending between the center post and the fine filter, where the helical curved wall guides the portion of the water to backflow through the fine filter and forces away at least some filtered residues from pores of the fine filter to prevent fouling or clogging of the fine filter. In addition, the method includes using an outside wiper spirally disposed around the fine filter to dislodge other filtered residues from the fine filter as the fine filter rotates.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first device and a second device may indicate different devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
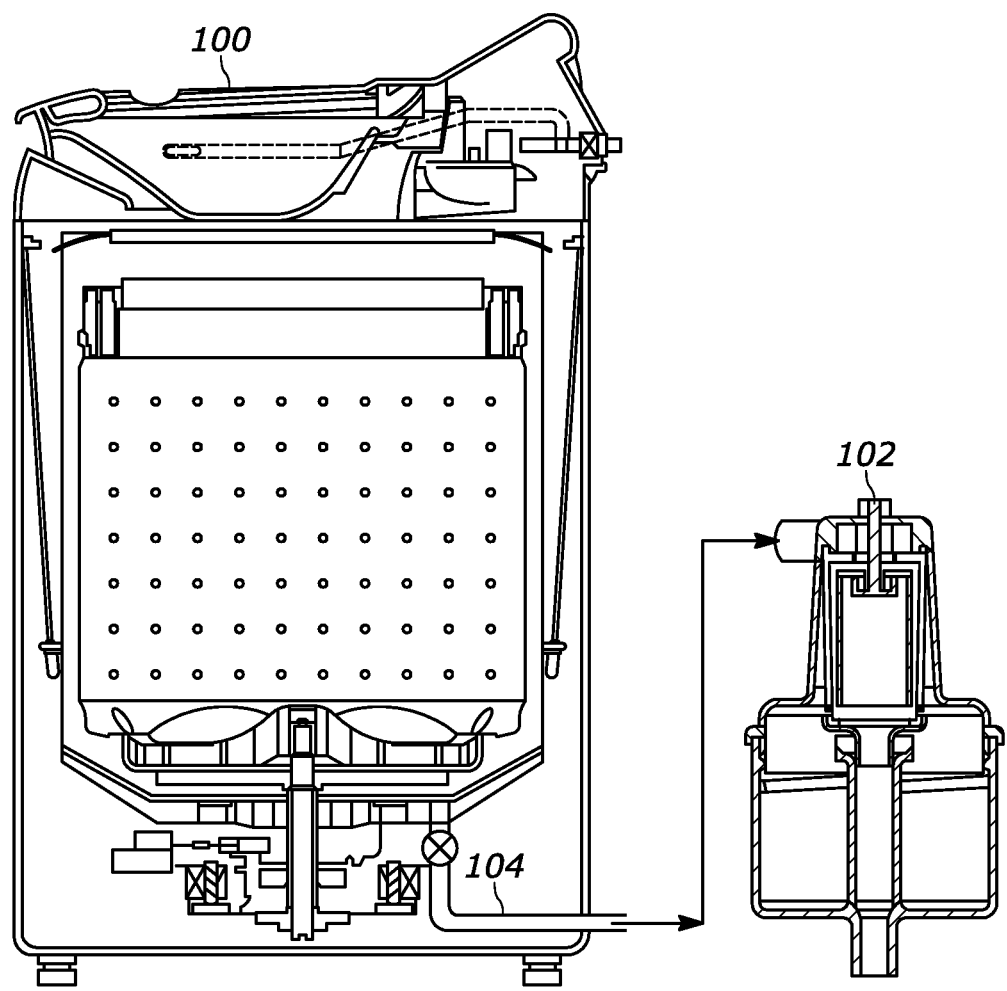
FIG. 1 illustrates an example appliance including a microplastic filter in accordance with this disclosure.
Figure 2A:
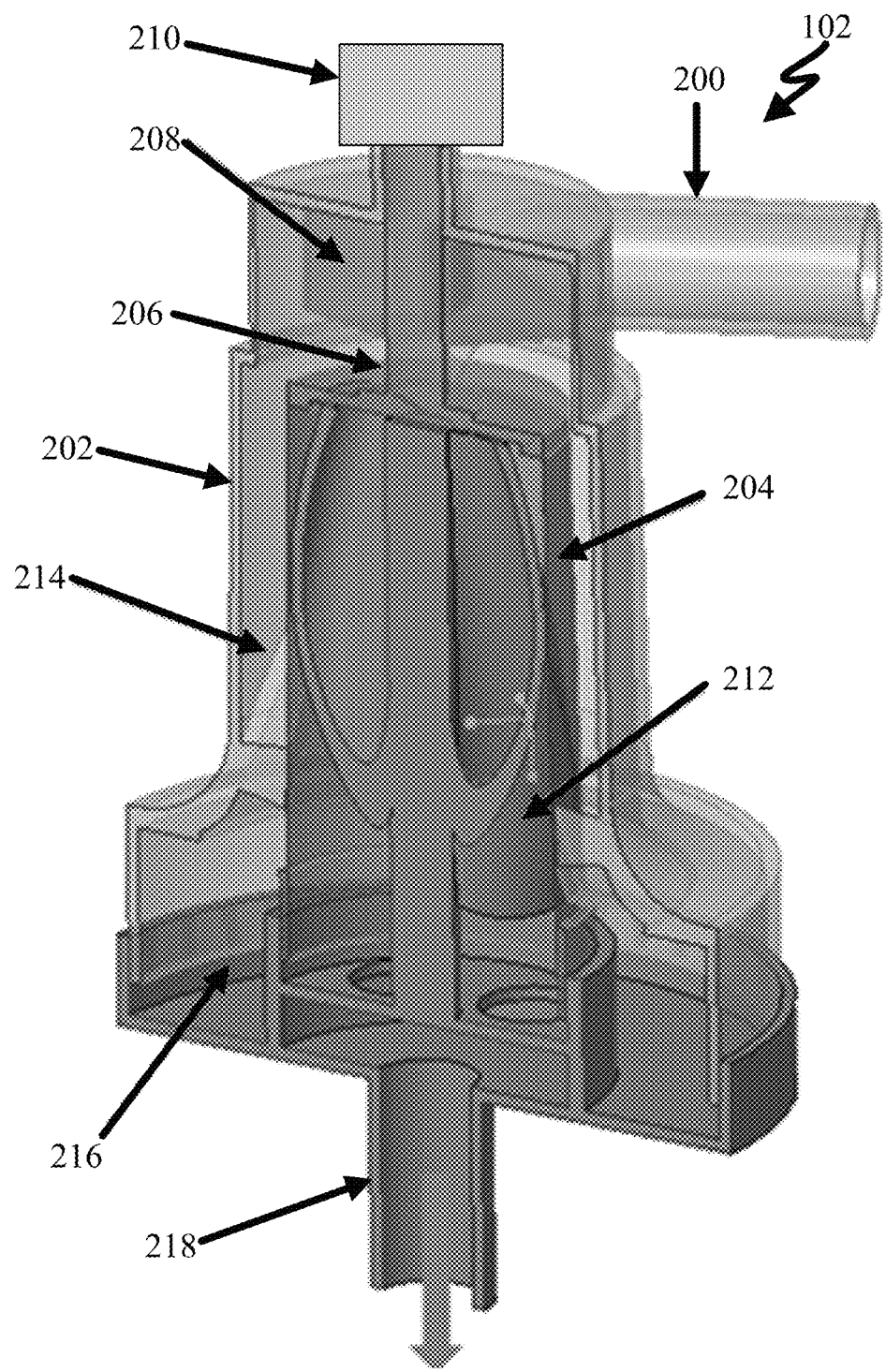
FIGS. 2A and 2B illustrate an example microplastic filter in accordance with this disclosure.
Figure 2B:
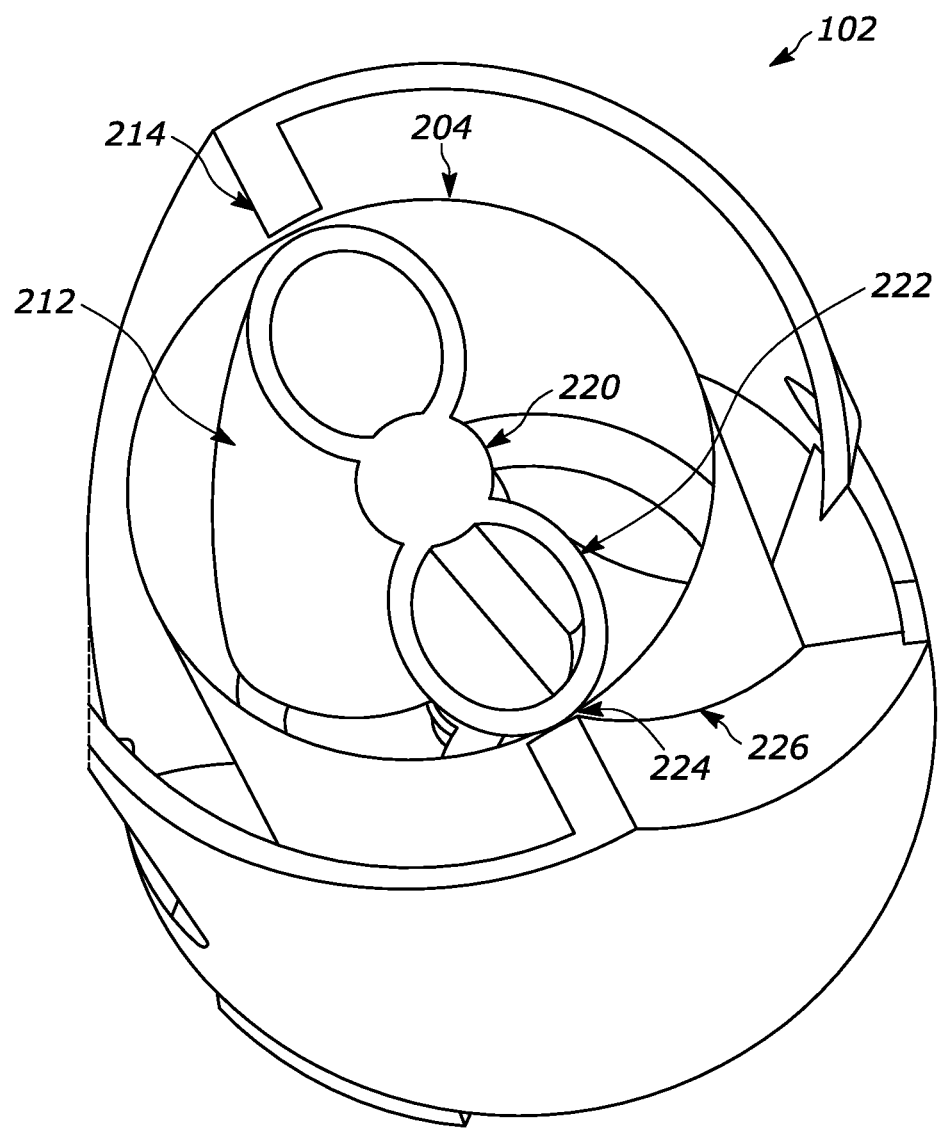
Figure 3:
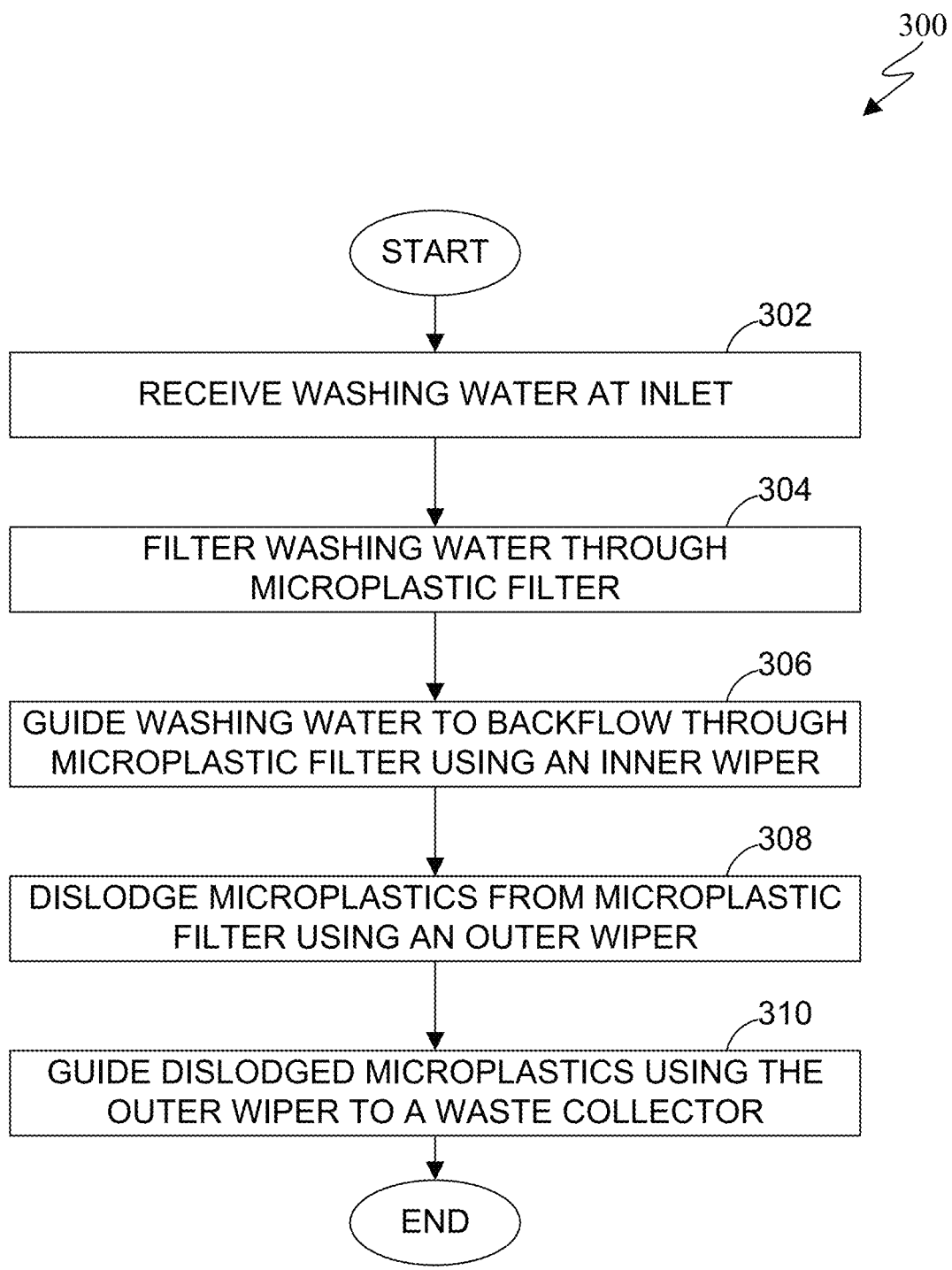
FIG. 3 illustrates an example method for filtering microplastics in accordance with this disclosure.

FIGS. 1 through 3, described below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, microplastic pollution is an unaddressed problem within the appliance industry. For example, in washing machines, microplastics from clothing can be dislodged during cleaning and can be released into the water supply when the washing machine is drained. This may allow microplastic contamination to enter wastewater treatment systems or other water-related systems or the environment.

This disclosure addresses filtration of microplastics. More specifically, this disclosure provides a filter for performing microplastic filtration using a rotary cylindrical filter screen and wipers positioned outside and inside of the rotating cylindrical filter screen. The one or more wipers outside of the rotating cylindrical filter screen can continuously clean the filter screen and direct the resulting filtrate to a targeted storage area. The one or more wipers inside of the rotating cylindrical filter screen that can create continuous backflow to prevent the filter screen from clogging or fouling. In this way, the filter is able to effectively remove a large amount of microplastics from a washing machine or other appliance. The filter can also achieve a high filtration rate while avoiding clogging or fouling, which may be necessary or desirable in a washing machine or other appliance. For instance, the filter can be used in a washing machine without substantially increasing the drain time or washing cycle time of the washing machine.

FIG. 1 illustrates an example appliance 100 including a microplastic filter 102 in accordance with this disclosure. In this particular example, the appliance 100 takes the form of a washing machine. However, this is for illustration and explanation only. The microplastic filter 102 may be used in or with any other suitable appliance or any other suitable device or system in order to provide microplastics filtering.

Since the appliance 100 here represents a washing machine, the appliance 100 can be used to wash objects, such as clothing, towels, or bed sheets. Water is supplied to the appliance 100 at a beginning of a washing cycle and at different times during the washing cycle. During the washing cycle, the appliance 100 can clean the objects, causing microplastics attached to the objects to mix with the water. At different times during the washing cycle, the water is pumped into a drain 104 and passes through the microplastic filter 102. The microplastic filter 102 can thereby filter microplastics before the water is output into a wastewater supply, such as a sewer system. One example embodiment of the microplastic filter 102 is shown in FIGS. 2A and 2B, which are described below.

Although FIG. 1 illustrates one example of an appliance 100 including a microplastic filter 102, various changes may be made to FIG. 1. For example, while the microplastic filter 102 is shown in FIG. 1 as being disposed externally from the appliance 100, the microplastic filter 102 can be implemented inside a housing or other portion of the appliance 100. Also, the microplastic filter 102 can be used in or with any other suitable appliance or other device or system, such as those using liquid as a medium for fabric treatment.

FIGS. 2A and 2B illustrate an example microplastic filter 102 in accordance with this disclosure. For ease of explanation, the microplastic filter 102 may be described as being used with the appliance 100. However, the microplastic filter 102 may be used in or with any other suitable appliance or other device or system, such as those using liquid as a medium for fabric treatment. As shown in FIGS. 2A and 2B, the microplastic filter 102 can include an inlet 200, a housing 202, a fine filter 204, a rotational shaft 206, an impeller 208, a motor 210, an inside wiper 212, an outside wiper 214, a waste collector 216, and an outlet 218. The inlet 200 of the microplastic filter 102 is configured to receive incoming water to be filtered, such as water received from or provided to the drain 104 of the appliance 100. The water can flow through the inlet 200 into the housing 202 of the microplastic filter 102. The inlet 200 can be sized based on the amount and rate of water being filtered, which (as described below) can maintain a pressure of the water to rotate the fine filter 204. The housing 202 of the microplastic filter can contain the fine filter 204, the rotational shaft 206, the impeller 208, the motor 210, the inside wiper 212, and the outside wiper 214. The housing 202 can define a flow path between the inlet 200 and the outlet 218. The housing 202 may be formed using any suitable material(s) and in any suitable manner.

The fine filter 204 can filter residues from the water entering the microplastic filter 102 via the inlet 200, such as the water received from or provided to the drain 104 of the appliance 100. Examples of residues can include microplastics and other materials. The fine filter 204 may have a substantially cylindrical shape or a shape with a constant diameter across a cross section in a plane perpendicular to a rotation axis of the fine filter. For example, the fine filter 204 can be formed in a conical shape. The fine filter 204 can be formed using a mesh with a spacing in a range from 5 microns to 100 microns. The spacing of the fine filter 204 determines a water flow through rate and a size of microplastics to be filtered. For a specified thickness mesh and specified size of the fine filter 204, a water flow through rate decreases as the spacing is reduced. The design of the fine filter 204 can be based a flow through rate of the fine filter 204 being at or above a flow rate through the inlet 200.

The fine filter 204 can rotate within the housing 202, and the fine filter 204 can be designed to rotate clockwise or counterclockwise. The fine filter 204 can be connected to the rotational shaft 206, and the rotational shaft 206 can be coupled to an impeller 208 and a motor 210. The impeller 208 can be positioned within the housing 202 adjacent to the inlet 200. In some embodiments, the impeller 208 can be rotated by the water flowing through the inlet 200, which causes the impeller 208 to rotate the fine filter 204. The motor 210 can also be utilized to rotate the fine filter 204. The motor 210 can be designed to rotate the rotational shaft 206 when operated and to allow the rotational shaft 206 to freely rotate when not operated. For example, a non-operation state of the motor 210 may not impact an ability of the impeller 208 to rotate the rotational shaft 206.

As water is passing through the fine filter 204, microplastics and other debris are filtered from the water, such as when the microplastics or other debris get stuck in the openings or pores of the fine filter 204. The inside wiper 212 can be stationary and positioned within the fine filter 204. The inside wiper 212 can include a center post 220 and one or more helical curved walls 222. The center post 220 can be positioned along the rotational axis of the fine filter 204, and the one or more helical curved walls 222 can extend from the center post 220 to a trailing edge 224 in a convex curve in relation to the rotation direction of the fine filter 204. In some embodiments, the convex curve can be an arch. Also, in some embodiments, there may be a uniform spacing between adjacent helical curved walls 222. The convex curve directs a portion of the water to backflow through the fine filter 204, where the water can put pressure on and loosen any microplastics or other debris stuck in the fine filter 204. The trailing edge 224 spirals around the center post 220 in a rotational direction of the fine filter 204 in relation to the outlet 218, and the trailing edge 224 can contact the fine filter 204.

The outside wiper 214 can be formed as a helical ramp, which spirals around an outside of the fine filter 204. The outside wiper 214 includes a leading edge 226 that spirals in a rotational direction of the fine filter 204 in relation from the outlet 218. The leading edge 226 is offset in the rotational direction from the trailing edge 224 of the helical curved wall(s) 222. For example, the leading edge 226 can be offset in a range from about 1° to about 20° in the rotational direction from the trailing edge 224 in relation to a plane perpendicular to the rotation axis of the fine filter 204. The leading edge 226 of the outside wiper 214 can be spaced apart from the fine filter 204. An angle of the outside wiper 214 in relation to a plane perpendicular to the rotational axis of the fine filter 204 may be substantially equal to an angle of the inside wiper 212 in relation to the plane perpendicular to the rotational axis of the fine filter 204.

In some embodiments, the inside wiper 212 can include first and second helical curved walls 222 spirally extending between the center post 220 and the fine filter 204. The first and second helical curved walls 222 can extend from opposite sides of the center post 220. The outside wiper 214 can also include first and second helical outside wipers 214 spirally extending around the fine filter 204 within the housing 202. The first and second outside wipers 214 can have leading edges 226 respectively extending in a rotational direction downstream of the trailing edges 224 of the first and second helical curved walls 222.

The outside wiper 214 can impact and remove microplastics or other debris caught in the openings or pores of the fine filter 204. The microplastics and other debris removed from the openings or pores of the fine filter 204 can be guided by the outside wiper 214 to the waste collector 216. In some embodiments, the waste collector 216 can be removably coupled at a base of the housing 202. The waste collector 216 can collect the microplastics and other debris removed from the water by the fine filter 204. The waste collector 216 can be removed or accessed in order to clear the collected microplastics and other debris. In some embodiments, the waste collector 216 does not have an outlet. In other embodiments, the waste collector 216 can have an outlet separate from the outlet 218. Any outlet of the waste collector 216 may not be connected to a wastewater supply, such as a sewer system, in order to prevent reintroduction of the microplastics or other debris into the water.

The outlet 218 outputs the filtered water, such as to a sewer system. In some embodiments, the outlet 218 can be connected to the housing 202 or separately connected to the appliance 100. The water that is released through the outlet 218 may contain little if any microplastics or other debris having a size greater than the minimum opening or minimum pore of the fine filter 204. For example, in some cases, the microplastic filter 102 can filter microplastics or other debris having a diameter or other size that is at least about 5 microns to about 100 microns.

Although FIGS. 2A and 2B illustrate one example of a microplastic filter 102, various changes may be made to FIGS. 2A and 2B. For example, the number and placement of various components of the microplastic filter 102 can vary as needed or desired. Also, the microplastic filter 102 can be used in any other suitable appliance filtering process or other process and is not limited to the specific processes described above.

FIG. 3 illustrates an example method 300 for filtering microplastics in accordance with this disclosure. For ease of explanation, the method 300 of FIG. 3 is described as being performed using the microplastic filter 102 of FIGS. 1, 2A, and 2B. However, the method 300 may be used with any other suitable filter and in any other suitable system.

As shown in FIG. 3, water is received from an appliance 100 (or other source) through an inlet 200 of the microplastic filter 102 at step 302. For example, the water can represent water drained from a washing machine or other appliance 100. The water can contain microplastics and other debris that would pollute the environment if released into a wastewater supply. In some cases, the inlet 200 can protrude from a housing 202 of the microplastic filter 102 at a first end and can be coupled to a hose or pipe, such as one extending from a drain 104 of the appliance 100.

The water passes through the fine filter 204 between the inlet 200 and the outlet 218 of the housing 202 at step 304. For example, the housing 202 can provide a flow path from the inlet 200 to the outlet 218 through the fine filter 204. The fine filter 204 can be designed to filter microplastics that are a minimum size, such as a minimum size within a range from about 5 microns to about 100 microns. The filtered water can be routed through the housing 202 to the outlet 218.

An inner wiper 212 causes a portion of the water to backflow through the fine filter 204 at step 306. For example, the fine filter 204 can be implemented to rotate within the microplastic filter 102. The rotation can be controlled, such as by using a motor 210 or an impeller 208 positioned at the inlet 200 of the housing 202. The rotation of the fine filter 204 can cause water to rotate within an interior of the fine filter 204. The inner wiper 212 can be shaped to guide or divert a portion of the rotating water to backflow through the microplastic filter 102. The diversion of the water can cause microplastics or other debris stuck in the fine filter 204 to be dislodged. In some cases, the inner wiper 212 can include a center post 220 and one or more helical curved walls 222. The helical curved wall(s) 222 can cause the rotating water to pass backwards through the fine filter 204, and the trailing edge(s) 224 of the helical curved wall(s) 222 can spirally extend along an inside surface of the fine filter 204.

An outer wiper 214 can dislodge at least some of the microplastics or other debris not dislodged by the backflow of the water at step 308. For example, microplastics or other debris not forced out by the backflow of the helical curved wall(s) 222 may be dislodged by a leading edge 226 of the outer wiper 214. The leading edge 226 of the outer wiper 214 can be spaced apart from the fine filter 204 so as to not interfere with the rotation of the fine filter 204. An angle of the leading edge 226 of the outer wiper 214 can be substantially aligned with and slightly offset from an angle of the trailing edge 224 of the inner wiper 212. The leading edge 226 of the outer wiper 214 can be offset in a rotational direction of the fine filter 204 from the trailing edge 224 of the inner wiper 212. The angles of the leading edge 226 and the trailing edge 224 can be defined in relation to a plane extending perpendicularly to a rotation axis of the fine filter 204.

In some embodiments, the inner wiper 212 can have first and second helical curved walls 222 spirally extending along an inside surface of the fine filter 204. The first and second helical curved walls 222 can extend in a symmetrical manner in relation to the center post 220. The second helical curved wall 222 can guide a second portion of the water to backflow through the fine filter 204 to force at least some of the filtered microplastics from the fine filter 204. A second outer wiper 214 can dislodge additional filtered microplastics from the fine filter 204 that remain after passing the trailing edge of the second helical curved wall 222.

The microplastics or other debris can be guided by the outer wiper 214 to a waste collector 216 at step 310. In some embodiments, the waste collector 216 can be a waste storage that is removably coupled to the housing 202, such as when the waste collector 216 can be removed from the housing 202 in order to remove the collected microplastics or other debris from the waste collector 216. The waste collector 216 may not have an outlet or may have an outlet that is not connected to the outlet 218 or a wastewater supply.

Although FIG. 3 illustrates one example of a method 300 for filtering microplastics, various changes may be made to FIG. 3. For example, while shown as a series of steps, various steps in FIG. 3 may overlap, occur in parallel, occur in a different odder, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A microplastic filter comprising:
a housing comprising an inlet configured to receive water;
a filter disposed to rotate within the housing and configured to filter residues from the water;
an inside wiper disposed within the filter and comprising:
a center post disposed along a rotational axis of the filter; and
a helical curved wall spirally extending between the center post and the filter, the helical curved wall configured to guide a portion of the water to backflow through the filter and force away at least some filtered residues from pores of the filter to prevent fouling or clogging of the filter; and
an outside wiper spirally disposed around the filter and configured to dislodge other filtered residues from the filter as the filter rotates.

2. The microplastic filter of claim 1, wherein the outside wiper is further configured to guide the filtered residues to a waste collector.

3. The microplastic filter of claim 2, wherein the waste collector does not have an outlet.

4. The microplastic filter of claim 1, wherein a leading edge of the outside wiper adjacent the filter is offset in a rotational direction of the filter from a trailing edge of the helical curved wall adjacent the filter.

5. The microplastic filter of claim 1, wherein:
the inside wiper further comprises a second helical curved wall spirally extending between the center post and the filter at a point on the center post opposite to the helical curved wall, the second helical curved wall configured to guide a second portion of the water to backflow through the filter and force additional filtered residues from the filter; and
the microplastic filter further comprises a second outside wiper spirally extending around the filter and configured to dislodge still other filtered residues from the filter as the filter rotates.

6. The microplastic filter of claim 1, further comprising:
an impeller coupled to the filter and disposed at the inlet of the housing, the impeller configured to rotate the filter when the water is pumped into the housing.

7. The microplastic filter of claim 1, wherein the filter is configured to filter residues in a range from about 5 microns to about 100 microns in diameter.

8. An appliance comprising:
a drain configured to output water; and
a microplastic filter comprising:
a housing comprising an inlet configured to receive the water;
a filter disposed to rotate within the housing and configured to filter residues from the water;
an inside wiper disposed within the filter and comprising:
a center post disposed along a rotational axis of the filter; and
a helical curved wall spirally extending between the center post and the filter, the helical curved wall configured to guide a portion of the water to backflow through the filter and force away at least some filtered residues from pores of the filter to prevent fouling or clogging of the filter; and
an outside wiper spirally disposed around the filter and configured to dislodge other filtered residues from the filter as the filter rotates.

9. The appliance of claim 8, wherein the outside wiper is further configured to guide the filtered residues to a waste collector.

10. The appliance of claim 9, wherein the waste collector does not have an outlet.

11. The appliance of claim 8, wherein a leading edge of the outside wiper adjacent the filter is offset in a rotational direction of the filter from a trailing edge of the helical curved wall adjacent the filter.

12. The appliance of claim 8, wherein:
the inside wiper further comprises a second helical curved wall spirally extending between the center post and the filter at a point on the center post opposite to the helical curved wall, the second helical curved wall configured to guide a second portion of the water to backflow through the filter and force additional filtered residues from the filter; and
the microplastic filter further comprises a second outside wiper spirally extending around the filter and configured to dislodge still other filtered residues from the filter as the filter rotates.

13. The appliance of claim 8, wherein the microplastic filter further comprises an impeller coupled to the filter and disposed at the inlet of the housing, the impeller configured to rotate the filter when the water is pumped into the housing.

14. The appliance of claim 8, wherein the appliance comprises a washing machine.

15. A method comprising:
receiving water through an inlet of a housing;
filtering residues from the water with a filter rotating within the housing;
guiding a portion of the water to backflow through the filter with an inside wiper disposed within the filter, the inside wiper comprising:
a center post disposed along a rotational axis of the filter; and
a helical curved wall spirally extending between the center post and the filter, the helical curved wall guiding the portion of the water to backflow through the filter and forcing away at least some filtered residues from pores of the filter to prevent fouling or clogging of the filter; and
dislodging other filtered residues from the filter with an outside wiper spirally disposed around the filter as the filter rotates.

16. The method of claim 15, further comprising:
guiding the filtered residues to a waste collector with the outside wiper.

17. The method of claim 15, wherein a leading edge of the outside wiper at the filter is offset in a rotational direction of the filter from a trailing edge of the helical curved wall at the filter.

18. The method of claim 15, wherein:
the inside wiper further comprises a second helical curved wall spirally extending between the center post and the filter at a point on the center post opposite to the helical curved wall, the second helical curved wall guiding a second portion of the water to backflow through the filter and forcing additional filtered residues from the filter; and
the filter further comprises a second outside wiper spirally extending around the filter that dislodges still other filtered residues from the filter as the filter rotates.

19. The method of claim 15, further comprising:
rotating the filter with an impeller coupled to the filter and disposed at the inlet of the housing when the water is pumped into the housing.

20. The method of claim 15, wherein the filter filters residues in a range from about 5 microns to about 100 microns in diameter.

* * * * *